July 29, 1969 G. J. TIBOL 3,457,614
PROCESS AND APPARATUS FOR MAKING THIN FILM CAPACITORS
Filed Sept. 29, 1964 4 Sheets-Sheet 1

INVENTOR
GEORGE J. TIBOL
BY James and Franklin
ATTORNEYS

PROCESS AND APPARATUS FOR MAKING THIN FILM CAPACITORS

Filed Sept. 29, 1964

4 Sheets-Sheet 2

INVENTOR
GEORGE J. TIBOL
BY James and Franklin
ATTORNEYS

PROCESS AND APPARATUS FOR MAKING THIN FILM CAPACITORS

Filed Sept. 29, 1964 4 Sheets-Sheet 3

INVENTOR
GEORGE J. TIBOL
BY James and Franklin
ATTORNEYS

INVENTOR
GEORGE J. TIBOL
BY James and Franklin
ATTORNEYS

United States Patent Office 3,457,614

Patented July 29, 1969

3,457,614

PROCESS AND APPARATUS FOR MAKING THIN FILM CAPACITORS

George J. Tibol, Fairview, N.J., assignor to General Instruments Corporation, Newark, N.J., a corporation of Delaware Filed Sept. 29, 1964, Ser. No. 400,010
Int. Cl. H01g 13/00
U.S. Cl. 29—25.42 14 Claims

ABSTRACT OF THE DISCLOSURE

A thin film capacitor is formed on a substrate in a vacuum chamber without removing the substrate from the vacuum chamber. First electrodes are formed by vapor depositing an anodizable metal through a first mask. A limited amount of oxygen then is admitted and ionized and a potential is applied to the electrodes to anodize the same in a somewhat reduced degree of vacuum. The chamber then is again evacuated and counter electrodes are vapor deposited through a second mask. An easily solderable metal may be vapor deposited through a third mask to form terminal lands on the counter electrodes. For the above purpose a rotatable turret is used in the vacuum chamber to carry the different masks, which are moved over the substrate by rotation of the turret. One station has no mask, and instead provides an anodizing contact and an ionizing electrode.

This invention relates to thin film capacitors, and microcircuits using such capacitors, and more particularly to a process and apparatus for making same.

It is already known to form thin film capacitors by vapor depositing an electrode on a substrate, and anodizing the electrode to form a dielectric, over which a counterelectrode is vapor deposited. The anodization has been performed in a liquid electrolyte, requiring removal of the substrate from the vacuum chamber in which the metal electrodes are deposited.

The general object of the present invention is to improve the manufacture of thin film capacitors. A more particular object is to provide a process in which the substrate being treated may be left in the vacuum chamber throughout the successive steps in the process, including particularly the anodization which provides the dielectric. Differently expressed, an object of the invention is to anodize the electrode in an ionized gas or plasma, rather than in a liquid. This minimizes handling and contamination, and insures maximum process cleanliness.

Other objects are to provide a thin film capacitor having improved characteristics, including good temperature characteristics, low dissipation factor, small variation with frequency (making it useful in high frequency applications), and low leakage at high temperature (making it useful in a high temperature environment). The capacitor also has the advantage of being non-polarized.

To accomplish the foregoing general objects, and other more specific objects which will hereinafter appear, my invention resides in the process steps and apparatus elements and their relation one to another, as are hereinafter more particularly described in the following specification. The specification is accompanied by drawings in which.

Figure 6:
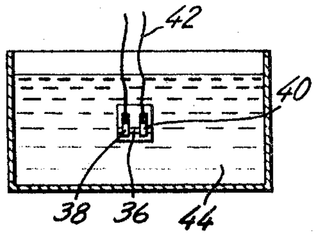
Figure 7:
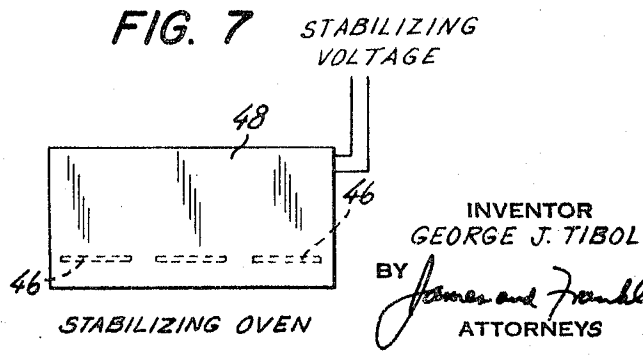
Figure 8:
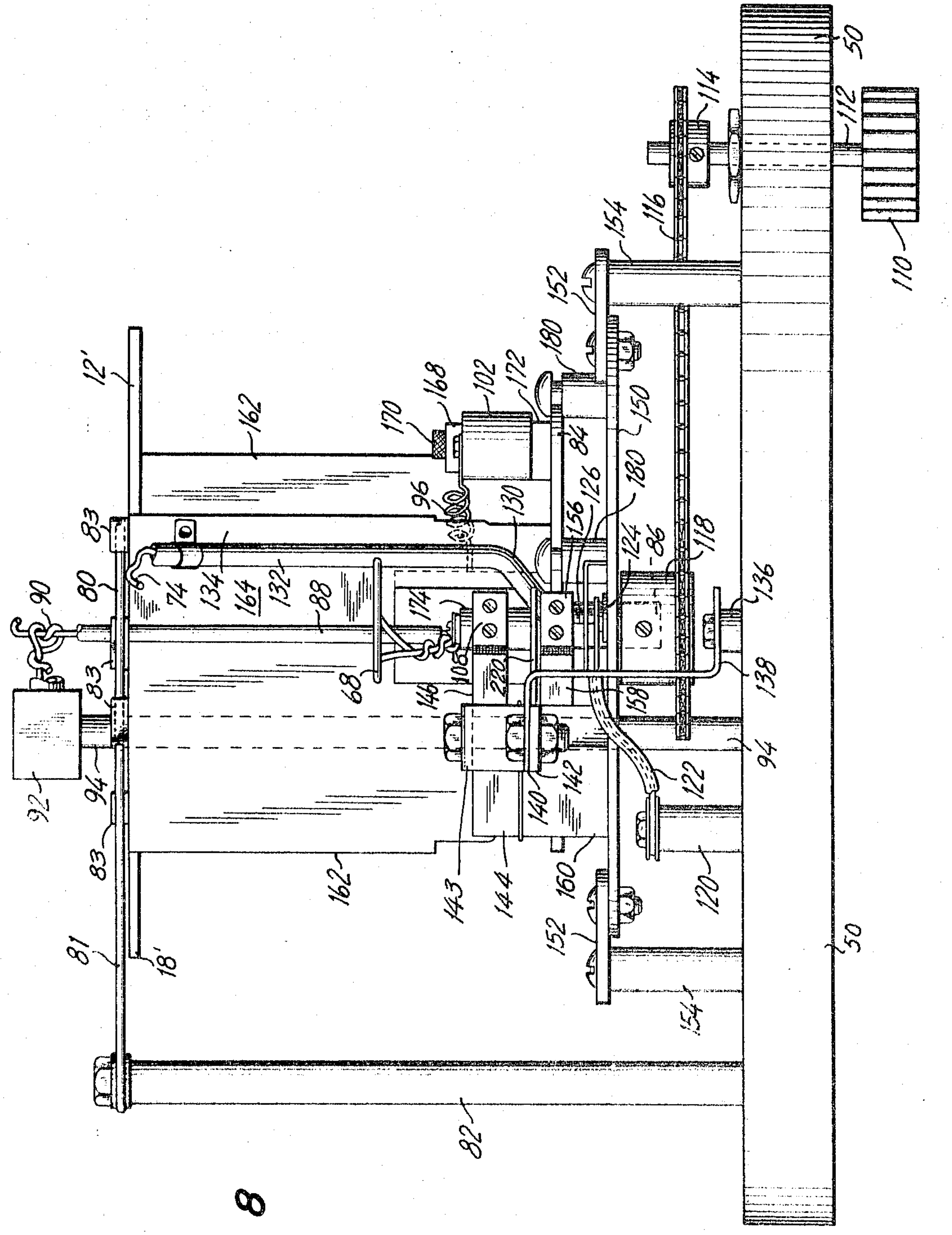
Figure 9:
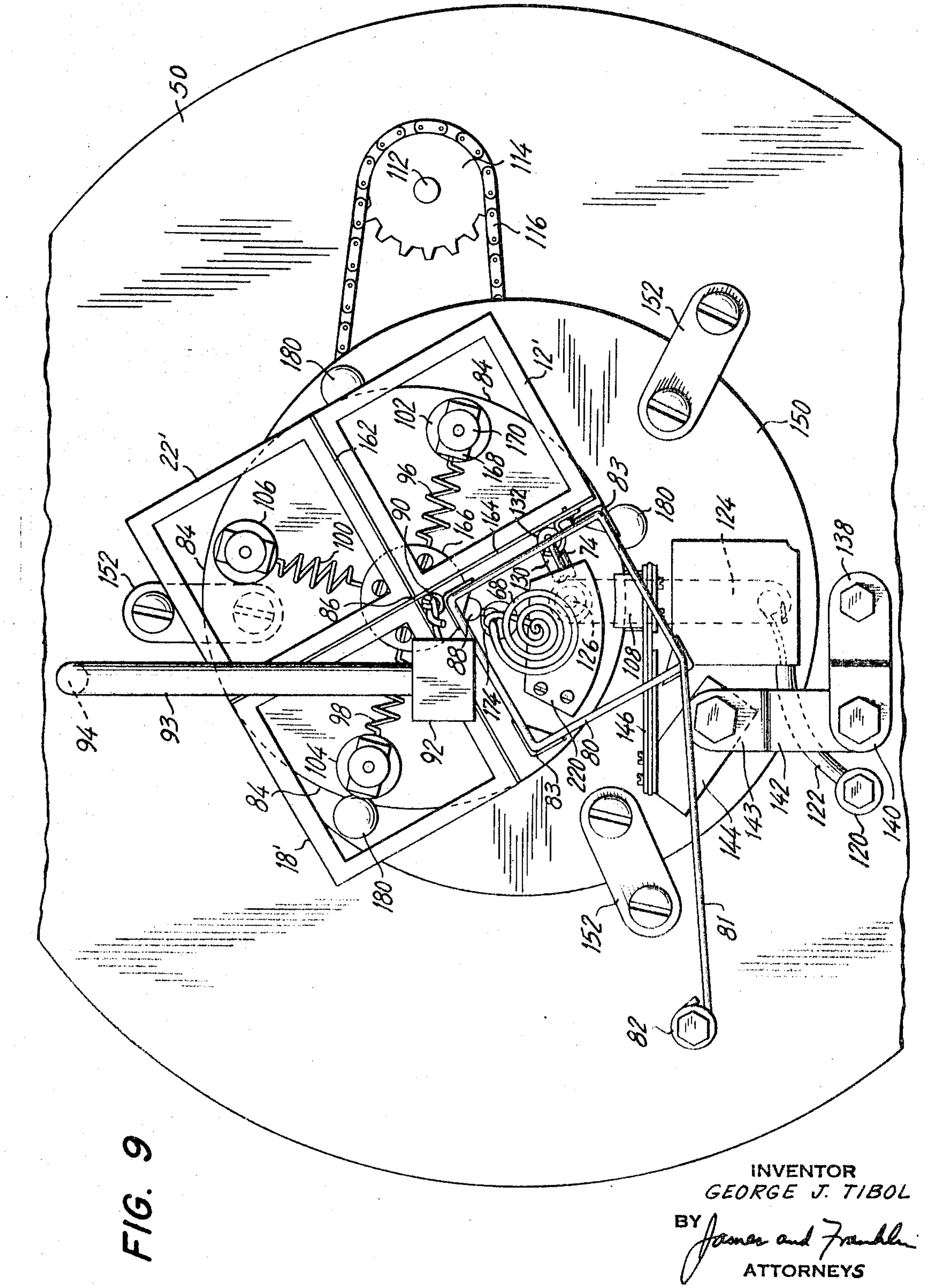
Figures 10, 11, 12:
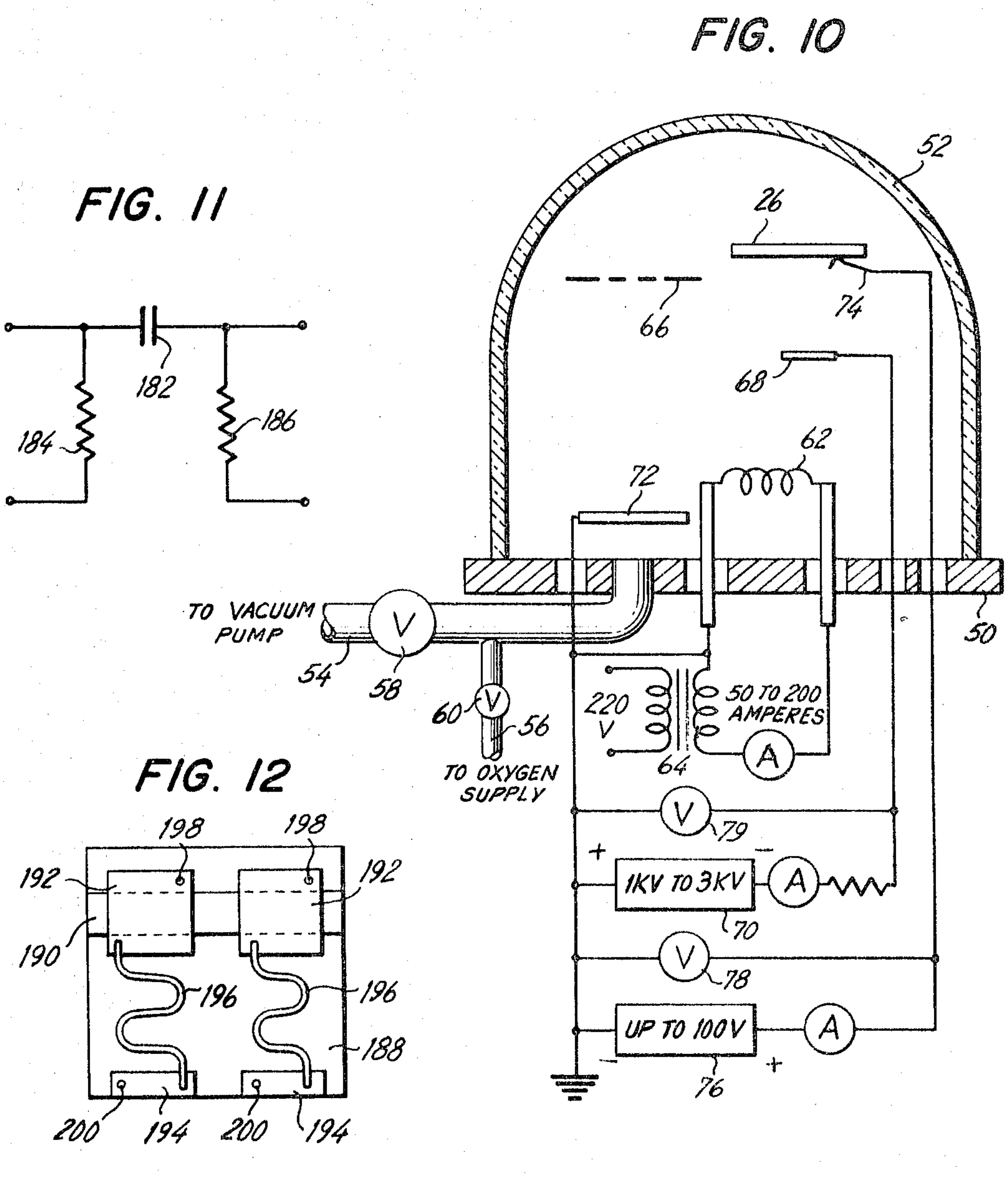
Figure 13:
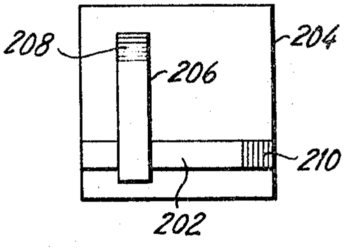

FIG. 6 schematically represents coating of the capacitor by immersion;

FIG. 7 schematically represents the aging or stabilizing of the capacitor by a prolonged application of heat;

FIG. 8 is an elevation of one form of apparatus which has been employed to practice the process;

FIG. 9 is a plan view of the same;

FIG. 10 is a schematic view explanatory of connections made through the base of the apparatus shown in FIGS. 8 and 9;

FIG. 11 is an electrical diagram showing a pi network which may be made in microcircuit form by means of the present invention;

FIG. 12 shows such a microcircuit;

FIG. 13 illustrates a single capacitor; and

Figure 14:
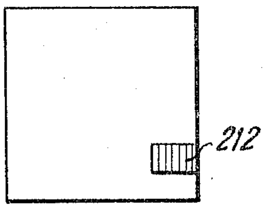

FIG. 14 shows a first land which may be preliminarily applied when making the capacitor of FIG. 13.

Figure 1:
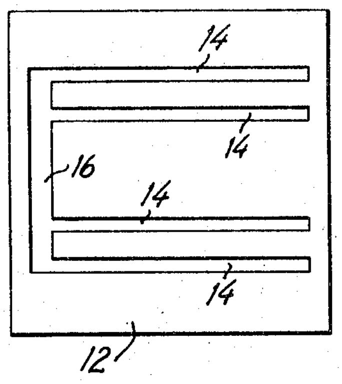
FIG. 1 shows a first mask for the deposit of electrodes on a substrate.

Referring to the drawing, FIG. 1 shows a mask 12 having bars or slots 14 connected by a cross slot 16. This mask is used to vapor deposit an anodizable electrode metal, for example aluminum, which subsequently is anodized to provide a dielectric.

Figure 2:
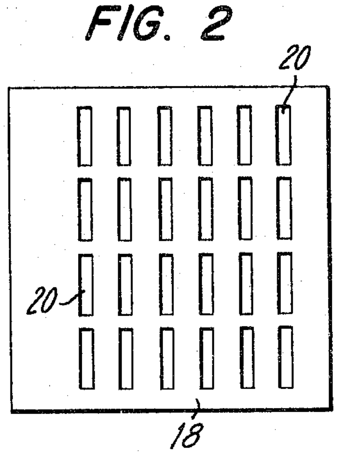
FIG. 2 shows a second mask for the deposit of counterelectrodes.

FIG. 2 shows a second mask 18 having short vertical slots 20, through which counterelectrodes may be deposited over the anodized surface and also some substrate surface.

Figure 3:
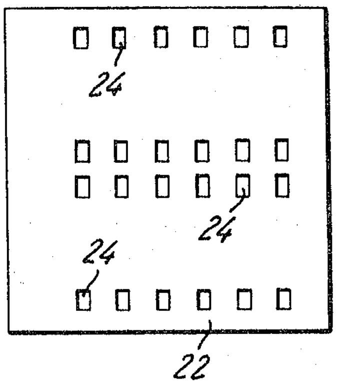
FIG. 3 shows a third mask for the application of terminal lands to the counterelectrodes.

FIG. 3 shows a third mask 22 having small openings 24 located for the deposition of lands made of copper or other metal suitable to facilitate the soldering of leads.

Figures 4, 5:
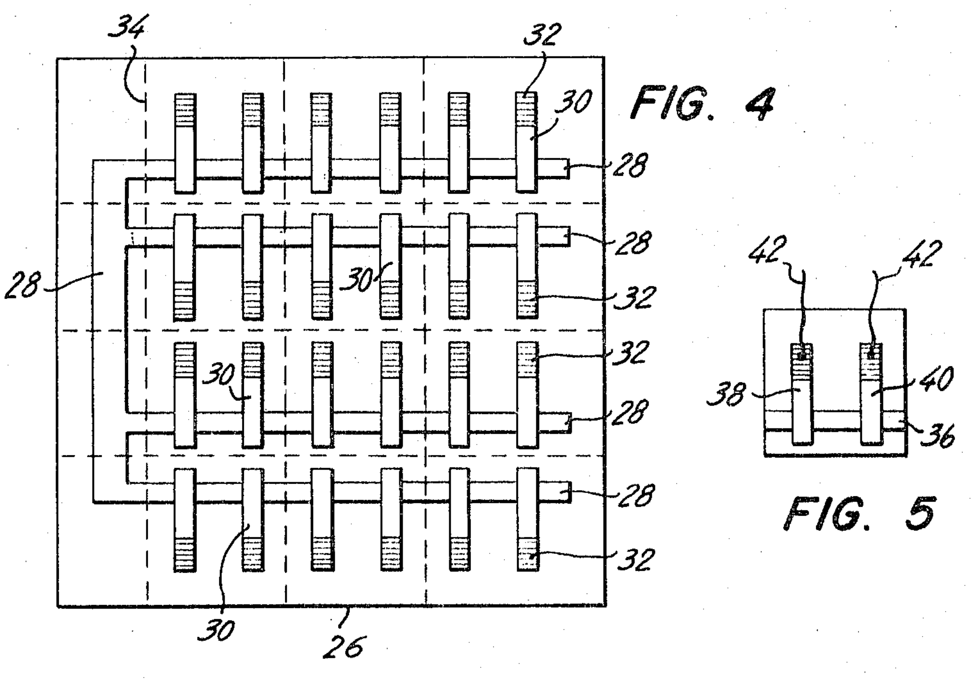
FIG. 4 shows a substrate on which the masks have been used for the deposition of electrodes, counterelectrodes, and lands.
FIG. 5 shows a capacitor unit formed by dicing the substrate of FIG. 4.

Referring now to FIG. 4, a substrate 26 made of an insulating material, typically glass, has received a first deposit of an anodizable metal at 28. This is anodized to provide a dielectric film, following which the counterelectrodes are deposited, as indicated at 30. Copper lands then are deposited over the ends of the counterelectrodes 30, as indicated at 32. The substrate then is diced or subdivided, as indicated by the broken vertical and horizontal lines, to form individual capacitor units. The vertical line 34 eliminates the connecting strip 28, which is no longer needed.

One of the resulting capacitor units is shown in FIG. 5, there being an anodized electrode 36, with counterelectrodes 38 and 40, to which are soldered the terminal leads 42. This unit has two capacitors in series, one at the intersection with counterelectrode 38, and the other at the intersection with counterelectrode 40. This construction is convenient for the soldering of external leads, because it avoids the need for abrading or otherwise removing the oxide from some of the electrode 36. However a single capacitor may be made, as is explained later.

Referring now to FIG. 6, the capacitor 36 is preferably dipped in a suitable liquid 44, such as silicone varnish, or epoxy resin, or Teflon, to provide an insulating and protective coating on the capacitor. It may be sprayed instead of dipped.

The capacitors are next stabilized or pre-aged, as is schematically represented in FIG. 7, in which capacitors 46 have been placed in an oven 48 where they are heated for a relatively long time, with a voltage applied thereto, as is explained later.

It will be understood that steps such as the coating of FIG. 6 and the aging of FIG. 7 are performed on a large quantity of capacitors at one time, the capacitors being quite small. That shown in FIG. 5, for example, would be say a quarter inch square or less, for a capacitor plate area of 0.06 by 0.06 inch. However a smaller substrate and narrower electrodes may be used.

The electrode metal is applied by vapor deposition in a vacuum, as is well known. A main feature of the present improvement is that the anodizing step is performed without disturbing or removing the substrate from the vacuum chamber. To this end the initially deposited electrode is anodized in an ionized gas or plasma. The procedure is to vapor deposit an anodizable metal on a substrate through a first mask in an evacuated vacuum chamber. A limited amount of oxygen then is admitted to the chamber (somewhat reducing the degree of vacuum), and the oxygen is ionized by the application of a high negative potential to an ionizing or glow discharge electrode in the chamber. A positive potential is simultaneously applied to the previously deposited capacitor electrodes, thereby attracting oxygen which anodizes the metal, following which the chamber again is more fully evacuated, and the counterelectrodes are vapor deposited. If terminal lands such as copper are wanted, they are next vapor deposited, all without removing the substrate from the vacuum chamber. It is then removed, diced, coated with an insulating coating, and stabilized by the passage of time. The stabilization is greatly accelerated by subjection to a raised temperature of say 150 to 200° C., for an adequate time, say three days, with a voltage applied to the capacitor.

A capacitor anodized at a particular voltage, say 50 volts, may break down at a value of say 80% of that or 40 volts, and therefore is stabilized at a voltage substantially less than 40 volts, for example 20 volts. The rating of the capacitor depends on the safety factor desired. The capacitor may be stabilized without applying voltage thereto, but that requires a longer time.

Referring now to FIG. 10, the vacuum chamber may comprise a base 50 and a removable transparent bell jar 52 placed thereover. There is a suitable connection 54 which leads to a vacuum pump, and another connection 56 which leads to a source of oxygen. These may be used alternatively, as is schematically suggested here by the valves 58 and 60. The substrate is shown at 26, it being elevated and inverted.

The electrode metal may be heated to vaporize the same by using a tungsten filament 62, and this is heated by a heavy current supplied at low voltage. In the present case a step down transformer 64 receives AC power at 220 volts, and steps it down to a voltage of from 10 to 20 volts. The heating current supplied by the secondary of the transformer 64 may range from say 50 to 200 amperes, it being understood that the aluminum is preliminarily applied to the filament, as by wrapping an aluminum wire on the filament. It will also be understood that in practice there may be two, three, or more such filaments for the successive deposition of metal films through different masks. One such mask is schematically indicated in an offset position at 66, but when used it would be beneath the substrate 26. The showing of FIG. 10 therefore is highly schematic.

During the anodizing step a high negative DC potential is applied to an ionizing or glow discharge electrode 68. This potential is supplied from a source 70, which as indicated, may supply a negative potential in a range from say one thousand to three thousand volts. The ionizing circuit is completed through a grounded plate, here suggested at 72, but which in practice may be the base of a turret, and also a stationary base above base 50, and on which the turret is rotatably mounted.

To attract oxygen ions to the metal film on substrate 26 the film is polarized or biased positively, and this is done by means of an elevated contact indicated at 74, the said contact being connected to a source 76 which supplies an adjustable positive DC voltage of from say zero to 100 volts. A typical value actually used may be say 50 volts. As is explained later, the thickness of the dielectric film may be determined by the voltage used, and a voltmeter 78 therefore is preferably provided. It is also convenient to provide a voltmeter 79 to indicate the negative voltage on the ionizing electrode 68, and to provide ammeters, as shown.

One particular apparatus employed for the present purpose may be described with reference to FIGS. 8 and 9 of the drawing. These show the base 50 of the vacuum chamber, but the bell jar is assumed removed. The base 50 carries an elevated holder 80 for the substrate, the arm 81 of holder 80 being fixedly carried at the upper end of a post 82. There is a rotatable turret having a circular base generally designated 84, beneath the holder 80, and this turret carries a plurality of elevated masks which may be moved closely beneath the substrate by rotation of the turret. For the sake of clarity the substrate and the masks are omitted in FIG. 9, but it will be understood that the substrate rests in the stationary holder 80, and that the masks (indicated at 12, 18 and 22 in FIGS. 1, 2 and 3) are supported in frames which in FIG. 9 are shown at 12', 18' and 22'. The axis of the turret, located at 86, is so offset from the holder 80 that rotation of the turret brings one or another of the masks into proper position directly beneath the substrate.

One station of the turret has no mask, and is used for the anodizing step. This station carries an elevated bias contact 74 for engaging the metal film on the substrate to apply the positive bias potential thereto. The same turret station also carries at a lower level an ionizing electrode 68 with suitable connections indicated at 88, 90, 92, 93 and 94 to supply a high negative ionizing potential to the electrode 68.

The other turret stations, that is, those having masks, each have means located well below the mask to vaporize the metal which is to be deposited. In the present case there are heavy tungsten filaments 96, 98 and 100, which provide the heat to vaporize the metal. The metal may be preliminarily applied directly around the filament. For small volume production, an aluminum wire may be wound on the filament.

The outer end of each filament is connected to a contact, indicated in FIG. 9 at 102, 104, and 106, these contacts being adapted to slidably engage a stationary contact 108, which supplies the filament heating current when the filament in question is located beneath the holder 80. A control means, for example a simple rotatable knob 110 (FIG. 8), turns a shaft 112 which passes through a suitable vacuum seal in base 50, and is operatively connected to the turret to rotate the same. In the present case there is a sprocket pinion at 114, moving a sprocket chain 116, which in turn engages a sprocket gear 118, secured at the lower end of a short turret shaft 86.

There are also sealed electrical connections which pass through the base 50. These are not shown below base 50 in FIG. 8, but are indicated in FIG. 10. More specifically there is a connection through post 94 (FIG. 8) which passes through the base 50, and which supplies a high negative potential for the ionizing or glow discharge electrode 68. Post 94 and arm 93 are preferably shielded as well as insulated. The positive bias potential for the anodizing electrode 74 is supplied through post 120, lead 122, and a radial strap 124 which extends inward to a position beneath the path of a vertical contact 126, which is insulatedly secured to and depends from the turret base 84, and which slidably engages the inner end of strap 124. The upper end of contact 126 receives a conductor which extends slopingly at 130, and upward at 132, to the elevated contact 74. The conductor passes through insulating tubing and is secured in position on an upright plate 164 forming a part of the turret, and described later. The tubing preferably has metal shielding, and this may be obtained as a result of the evaporation of electrode metal.

The low-voltage high-amperage heating current is supplied at 136 through base 50, and thence to a fixed stepped strap 138, the upper end 140 of which is secured to an inwardly directed strap 142. This also steps upward at 143, and there connects to a block 144 carrying a laminated strap 146 which acts in cantilever, and which at its free or movable end carries the contact 108 against which one or another of the filament contacts 102, 104 and 106 of the turret engages when its filament is in working position beneath the substrate.

The remaining electrical connection is a ground connection, and the base 50 is conveniently at ground potential. However, this is preferably supplemented by a grounded sub-base plate 150, which is fixedly supported by means of three radial straps 152 mounted on three short posts 154 (FIG. 8), the sub-base 150 carrying the rotatable turret. The base 84 of the turret is grounded by its mechanical mounting, but this ground is preferably supplemented by an additional wiping contact indicated at 156, and carried at the free or movable end of a cantilever laminated strap 158, generally like and located beneath the strap 146 which was previously referred to. However, strap 158 is mounted on a support block 160, which in turn is mounted on base 150, and thereby is grounded. Blocks 144 and 160 may be superposed but are insulated from one another. The ground contact 156 engages the perimeter of the circular turret disc 84, thereby maintaining a dependable improved ground connection.

Inasmuch as the base plate 84 of the turret is turned on a short spindle having only one bearing it is preferred to mechanically support the rotatable plate 84, and this is done by means of three stabilizing posts, two of which are indicated at 180 in FIG. 8. The upper ends of the posts are grooved to slidably receive the periphery of the turret disc 84. The three supports 180 are indicated in FIG. 9, these being mounted on the stationary plate 150 at suitably distributed points around the rotatable plate 84. They provide an additional ground.

The particular turret here shown comprises not only the circular bottom disc 84, but also upright walls made of stainless steel sheet metal, these being in cruciform relation as shown at 162 and 164 in FIG. 9, and serving to divide the turret space into four quarter sections. The upper ends of these sheet metal partitions serve to carry the three mask frames. The upright high voltage conductor 88 is secured in the corner of its turret section, and its upper end is displaced slightly to be centered on the axis of the turret, so as not to interfere with rotation of the turret. The inner ends of the filaments are releasably secured in a grounded hub portion of the turret shown at 166, the filaments being held by set screws as shown.

The outer ends of the filaments are clamped beneath blocks 168 releasably held by knurled knobs 170. The movable contacts such as 102 in FIG. 8, are mounted on insulation 172 to insulate the same from the grounded turret plate 84.

The electrode 68 is here shown formed by a spiral of wire which is mounted in its turret section on an insulating pedestal 174. The electrode is connected to the lower end of the upright conductor 88.

The high voltage conductor passing through the upright 94, the horizontal overhung arm 93, and the box 92, is preferably shielded, that is, the conductor is not only insulated, but is housed within grounded metal, the purpose of this being to discourage ionization in the chamber as a whole, and to localize the ionization to that turret station or quadrant beneath the substrate. For the same purpose a shield 220 (FIG. 9) is disposed beneath the ionizing electrode 68, and above the connection 126 of the bias voltage supply.

The substrate holder 80 and arm 81 are here shown formed of a single piece of stainless steel wire. The outer end of arm 81 is secured at 82, and the inner end is bent to form a rectangle on which the substrate rests. Four sheet metal corners are welded to the wire, as indicated at 83, and these help confine the substrate against movement when it is in the holder.

It has been found important during anodization to minimize grounded areas at and near the substrate. It is for this reason that the holder 80 for the substrate is preferably a thin wire frame. Also the glow discharge electrode 68 preferably should be located between the substrate and the grounded bottom plate of the turret.

The metal used may be an anodizable material such as silicon or germanium, and also the valve metals such as aluminum, titanium, tantalum, hafnium, vanadium, zirconium and chromium. The oxides of these metals are excellent dielectrics.

The vaporization is performed in a vacuum of $10^{-6}$ mm. mercury. When a limited amount of oxygen is admitted, the vacuum may decrease to say $10^{-3}$ mm. mercury. The anodization may be carried out for say six hours. At a given voltage the anodizing current levels off after a time, and therefore the anodizing voltage may be used to determine the thickness of the dielectric if the anodizing step is carried out long enough to reach a levelling off of the anodizing current. The vacuum is again carried to $10^{-6}$ mm. mercury for the succeeding deposits of metal.

The process is not limited to the production of capacitors alone. It may be used to make microcircuits utilizing capacitors and other circuit elements as well. An example may be described with reference to FIGS. 11 and 12 of the drawing. FIG. 11 shows a pi network comprising a capacitor 182 and two resistors 184 and 186. This may be made in miniature form on a substrate as illustrated in FIG. 12, in which the substrate 188 receives an electrode strip 190. This is anodized to provide a dielectric, whereupon counterelectrodes are deposited, as indicated at 192. If desired, two terminal strips may be deposited at the same time, as indicated at 194.

A third mask then may be used for the vapor deposit of a high resistance metal such as "Nichrome." This is deposited in appropriate width, thickness, and length, to provide the desired resistance value, and the length may be increased by printing the film in zig-zag form, as shown at 196. The deposit may be made as previously described, by using a heating filament and mask, except that the metal applied to the filament and vaporized thereby is a resistive metal instead of a highly conductive metal. The overlap at the ends provides the desired connection to the electrodes 192 and to the terminals 194.

If the four external leads are to be soldered it may be desired to apply copper or gold lands, and spots for this purpose are indicated at 198 on the electrodes 192, and at 200 on the terminal strips 194. It will be understood that in such case the turret would require five stations instead of four, the extra station being used for the resistance films 196. However, if the lands 198 and 200 are not needed, as for example, when using a thermal compression bond instead of solder, a four station turret such as that previously described may be employed, the difference being that the fourth station is used for the resistors 196, instead of being used for copper lands.

The illustrated unit had a capacitance of 5000 picofarads and the resistors had a value of 100,000 ohms each. The electrodes had a width of 0.06 inch. The substrate was one quarter inch square.

The resistors 196 may be titanium or tantalum in that impure form in which they have a high resistance. (Tantalum and titanium are also usuable as electrode metal suitable for anodization, but in such case are used in substantially pure form, rather than with a nitrate or dioxide content for increased resistivity.) Certain cermets may be used when adapted to be deposited by evaporation, as is done with the metals.

It has already been mentioned that the use of two capacitors in series, as shown in FIG. 5 and FIG. 12, is convenient but not essential. FIG. 13 shows a capacitor formed by depositing an electrode 202 on a substrate 204. After anodization, a counterelectrode 206 is deposited, and this may be given a land indicated at 208. To provide connection to the electrode 202, it is necessary to scrape away the dielectric at one end, as indicated at 210. If the exposed metal is to be coated with copper or other easily solderable metal, the printing of the land 208 might be deferred, and both lands 208 and 210 printed simultaneously. This is undesirable because of needed removal from the vacuum chamber for intermediate scraping.

It is found more convenient to provide the land 210 in advance, and referring to FIG. 14, a first or preliminary step may be the deposit of a land as shown at 212. This is followed by a deposit of an electrode like electrode 202 shown in FIG. 13. At the end of the process the dielectric and the electrode metal may be abraded for part of the area of the land 212, thereby exposing part of the land for the soldering of a lead thereto.

Some further details may be mentioned. In my work contamination by dust, pump oil, or unintended oxidation was minimized. The slides (which were 0.01 inch thick glass) were cleaned ultrasonically and immediately transferred to the vacuum system. They were further cleaned by ion bombardment before evaporating the base electrode. The evaporant was 99.999% aluminum. Thin films of aluminum have good conductivity and are adherent to the glass substrate upon which they are deposited.

Previous outgassing made it possible to keep the pressure at $10^{-6}$ torr during the first evaporation. As soon as possible after completion of this evaporation step, oxygen was admitted and both anodizing and glow discharge potentials were applied. Purified oxygen was passed through a liquid nitrogen trap before being admitted. The anodizing voltage was raised in steps such that the current density did not exceed 5 ma./cm.$^2$ (30 ma. total). It is difficult to draw more than this without seriously disturbing the glow discharge, which operated at 50 ma.

The anodizing current decreased to a low value, in a manner similar to that observed with wet electrolytes. Anodizing was continued until the current diminished to a few percent of the initial current value. Voltages up to 90 were used in some cases but 50 volts was more usual. Most films were formed with the substrate at the local ambient temperature in the vacuum system, estimated to be nearly 200° C.

The oxide growth shows a linear rate, at low voltages, of about 22 angstroms/volt. The rate above about 50 volts diminishes and may reach a limiting value of thickness near 1660 angstroms for 80 to 90 volts. The growth rate agrees quite well with that for wet anodized aluminum. With an appropriate setup and control of the ionization discharge, the oxidizing time may be reduced considerably.

It is believed that my improvement in the manufacture of thin film capacitors, as well as the advantages thereof, will be apparent from the foregoing detailed description.

The usual tantalum capacitor technology employs wet anodization and requires removal of the microcircuit from the vacuum system between two vapor deposition steps. Furthermore, unless highly conductive material is also introduced into the system, the tantalum capacitors tend to have high series resistance. Silicon monoxide has various undesirable characteristics as a capacitor dielectric. It has a poor dissipation factor, poor breakdown strength, and is somewhat unstable in composition.

The present aluminum oxide capacitors as fabricated by plasma anodization have better electrical characteristics and can be fabricated in a single pass through a bell-jar system, thus maintaining maximum process cleanliness. Furthermore, in contrast to electrolytic aluminum oxide capacitors, the plasma-anodized aluminum oxide capacitors are free of pin holes and are essentially non-polar.

By anodizing to 50 volts, a capacitance of approximately 0.2 $\mu$f. per square inch is obtained. The value of 50 volts is mentioned for example, and should not be considered a limit on the anodizing voltage. The capacitance is a function of temperature, and the average temperature coefficient of capacitance is approximately +340 p.p.m./° C. between −65° C. and +150° C.

The dissipation factor of the aluminum oxide capacitor is quite low, especially when compared with silicon monoxide and wet anodized aluminum capacitors. At 1000 cycles it is about 0.5% at room temperature, rising to 1% at 150° C.

The capacitance and dissipation factor are not particularly sensitive to frequency over the frequency range measured (1 kc. to 1 mc.). The capacitance decreases about 2% from 1 kc. to 1 mc., while the dissipation factor remains low, being on the order of 1% at 1 mc. Therefore the plasma anodized capacitors may be used for high frequency applications as effectively as other types of capacitors presently available for microcircuitry.

The insulation resistance of the aluminum oxide dielectric is very good. It is better than $10^{12}$ ohms at room temperature for about 500 pf., and decreases with increasing temperature, but at 150° C. the insulation resistance is still greater than $10^9$ ohms, so that the capacitor is usable for applications up to this temperature.

The yield of the fabrication process is high, say 98%, with the 2% damage resulting solely from the cutting up of the substrate. Other than mechanical handling losses during test programs, there have been no losses during either the aging or 1000 hour life testing.

To summarize, plasma anodization may be used to produce exceptionally high quality thin film capacitors suitable for microcircuit applications. The complete circuit may be produced in a single pass through the vacuum system. The process parameters may be readily controlled to produce the desired characteristics at high yield.

It will be understood that quantitative values and dimensions have been given by way of example, and are not intended to be in limitation of the invention. It will therefore be understood that while I have shown and described the invention in a preferred form, changes may be made without departing from the scope of the invention as sought to be defined in the following claims. In the claims, the term "capacitor" is not intended to exclude a microcircuit (such as the described pi network) which includes a capacitor.

I claim:

1. The method of making thin film capacitors on a substrate in a vacuum chamber without removing the substrate from the vacuum chamber, which method includes vapor depositing an anodizable metal on a substrate through a first mask in an evacuated chamber to form capacitor electrodes, admitting a limited amount of oxygen to the chamber and ionizing the oxygen by the application of a high negative potential to an electrode in the chamber, applying a positive potential to the capacitor electrodes to anodize the same in a somewhat reduced degree of vacuum, again evacuating the chamber and vapor depositing counterelectrodes through a second mask, then vapor depositing an easily solderable metal through a third mask to form terminal lands on the counterelectrodes, all without removing the substrate from the vacuum chamber.

2. The method of making thin film capacitors which includes vapor depositing an anodizable metal on a substrate through a first mask in an evacuated chamber to form capacitor electrodes, admitting a limited amount of oxygen to the chamber and ionizing the oxygen by the application of a high negative potential to an electrode in the chamber, applying a positive potential to the capacitor electrodes to anodize the same, again evacuating the chamber and vapor depositing counterelectrodes through a second mask, all without removing the substrate from the vacuum chamber, removing and dicing the substrate, coating the resulting capacitors with an insulating coating, and thereafter stabilizing the capacitors by keeping them at a high temperature for an adequately long time.

3. The method of making thin film capacitors which includes vapor depositing an anodizable metal on a substrate through a first mask in an evacuated chamber to form capacitor electrodes, admitting a limited amount of oxygen to the chamber and ionizing the oxygen by the application of a high negative potential to an electrode in the chamber, applying a positive potential to the capacitor electrodes to anodize the same, again evacuating the chamber and vapor depositing counterelectrodes through a second mask, then vapor depositing an easily solderable metal through a third mask to form terminal lands on the counterelectrodes, all without removing the substrate from the vacuum chamber, removing and dicing the substrate, coating the resulting capacitors with an insulating coating, and thereafter stabilizing the capacitors by keeping them at a high temperature of 150 to 200° C. for about three days while applying to the capacitor a potential well below the anodizing potential.

4. Apparatus for making thin film capacitors, said apparatus comprising a vacuum chamber, means to vapor deposit an anodizable metal on a substrate through a first mask in the vacuum chamber to form capacitor electrodes, means to admit oxygen to the chamber, means to apply a high negative potential to an electrode in the chamber to ionize the oxygen; means to apply a positive potential to the capacitor electrodes to anodize the same, means to vapor deposit counterelectrodes through a second mask in the chamber, and means to vapor deposit an easily solderable metal through a third mask to form terminal lands on the counterelectrodes, all without removing the substrate from the vacuum chamber.

5. Apparatus for making a thin film capacitor, said apparatus comprising a vacuum chamber, a holder for a substrate, a rotatable turret, said turret carrying a plurality of masks which may be moved to the substrate by rotation of the turret, one station of the turret having no mask and carrying an anodizing contact for engaging the substrate to apply a positive potential thereto and further carrying an ionizing electrode with suitable connections to supply an ionizing potential thereto, the turret stations with masks having means to vaporize an anodizable metal, an external control means operatively connected to the turret to rotate the same, electrical connections through a chamber wall to supply a potential for the ionizing electrode, and a positive bias potential for the anodizing electrode, said chamber also having means for connection to a vacuum pump and to an oxygen supply source.

6. Apparatus as defined in claim 5 in which the turret is grounded, and the ionizing electrode is located between the substrate holder and the grounded turret.

7. Apparatus as defined in claim 5 in which the electrical supply connection to the ionizing electrode is insulated and shielded.

8. Apparatus as defined in claim 5 in which the electrical supply connection to the anodizing electrode is insulated and shielded.

9. Apparatus as defined in claim 5 in which the electrical supply connection to the ionizing electrode is insulated and shielded and in which the electrical supply connection to the anodizing electrode is insulated and shielded.

10. Apparatus as defined in claim 5 in which the substrate holder is grounded and comprises a frame of minimum area in order to minimize the grounded area at the substrate.

11. Apparatus for making a thin film capacitor, said apparatus comprising a vacuum chamber having an elevated holder for a substrate, a rotatable turret beneath the holder, said turret carrying a plurality of elevated masks which may be moved closely beneath the substrate by rotation of the turret, one station of the turret having no mask and carrying an anodizing contact for engaging the substrate to apply a positive potential thereto and further carrying an ionizing electrode with suitable connections to supply a high negative ionizing potential thereto, the turret stations with masks each having means well below the mask to vaporize a metal, said means being electrically heated and including contacts adapted to slidably engage a stationary supply contact when the station is beneath the stationary substrate, an external control operatively connected to the turret to rotate the same, electrical connections through a chamber wall to supply a high negative potential for the ionizing electrode, a positive bias potential for the anodizing electrode, and a heavy current for the tungsten filaments, said chamber also having means for connection to a vacuum pump and to an oxygen supply source.

12. Apparatus for making thin film capacitors, said apparatus comprising a vacuum chamber formed by a base and a removable bell jar, said base carrying an elevated holder for a substrate, a rotatable turret beneath the holder, said turret carrying a plurality of elevated masks which may be moved closely beneath the substrate by rotation of the turret, one station of the turret having no mask and carrying an elevated anodizing contact for engaging the substrate to apply a positive potential thereto and further carrying a lower ionizing electrode with suitable connections to supply a high negative ionizing potential thereto, the turret stations with masks each having means well below the mask to vaporize a metal, said means including heavy tungsten filaments and contacts adapted to slidably engage a stationary supply contact for filament heating current when the station is beneath the stationary substrate, a control means passing downward through the base and operatively connected to the turret to rotate the same, electrical connections through the base to supply a high negative potential for the ionizing electrode, a positive bias potential for the anodizing electrode, and a heavy current for the tungsten filaments, said base also having means for connection to a vacuum pump and to an oxygen supply source.

13. Appaartus as defined in claim 12 in which the electrical supply connection to the ionizing electrode is insulated and shielded, and in which the electrical supply connection to the anodizing electrode is insulated and shielded.

14. Apparatus as defined in claim 12 in which the substrate holder is grounded and comprises a frame of minimum area in order to minmize the grounded area at the substrate.

References Cited

UNITED STATES PATENTS

| | | | |
|---|---|---|---|
| 2,886,502 | 5/1959 | Holland | 204—192 |
| 2,993,266 | 7/1961 | Berry | 204—192 |
| 3,206,322 | 9/1965 | Morgan | 204—298 |
| 3,220,938 | 11/1965 | McLean et al. | 204—192 |
| 3,294,660 | 12/1966 | Kingery | 204—192 |
| 3,159,556 | 12/1964 | McLean et al. | 204—37 |
| 3,293,085 | 12/1966 | Smith et al. | 204—37 |

OTHER REFERENCES

The Formation of Metal Oxide Films Using Gaseous and Solid Electrolytes, J. L. Miles et al., Journal of The Electrochemical Soicety, December 1963, pp. 1240–1245.

HOWARD S. WILLIAMS, Primary Examiner

T. TUFARIELLO, Assistant Examiner

U.S. Cl. X.R.

204—164, 312